United States Patent
Schondorf

(10) Patent No.: US 7,892,128 B2
(45) Date of Patent: Feb. 22, 2011

(54) HYBRID ELECTRIC VEHICLE AND POWERTRAIN

(75) Inventor: Steven Schondorf, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/702,672

(22) Filed: Feb. 9, 2010

(65) Prior Publication Data

US 2010/0139998 A1    Jun. 10, 2010

Related U.S. Application Data

(62) Division of application No. 11/464,589, filed on Aug. 15, 2006, now Pat. No. 7,686,723.

(51) Int. Cl.
*F16H 3/72* (2006.01)

(52) U.S. Cl. .......................................... 475/5

(58) Field of Classification Search ........................ 475/5
See application file for complete search history.

(56) References Cited

U.S. PATENT DOCUMENTS

| | | | |
|---|---|---|---|
| 5,558,588 | A | 9/1996 | Schmidt |
| 5,643,119 | A | 7/1997 | Yamaguchi et al. |
| 5,791,427 | A | 8/1998 | Yamaguchi |
| 5,899,286 | A | 5/1999 | Yamaguchi |
| 5,904,631 | A | 5/1999 | Morisawa et al. |
| RE38,017 | E | 3/2003 | Yamaguchi et al. |
| 6,599,216 | B1 | 7/2003 | Wafzig et al. |
| 6,654,672 | B2 * | 11/2003 | Yamaguchi et al. ........... 701/22 |
| 6,692,394 | B2 | 2/2004 | Takenaka |
| 6,695,736 | B2 | 2/2004 | Takenaka |
| 6,896,080 | B2 | 5/2005 | Takenaka |
| 7,314,421 | B2 | 1/2008 | Kim |
| 7,367,910 | B2 * | 5/2008 | Schmidt ........................ 475/5 |
| 2003/0100395 | A1 | 5/2003 | Hiraiwa |
| 2004/0112654 | A1 | 6/2004 | Kozarekar et al. |
| 2004/0149501 | A1 | 8/2004 | Imazu et al. |
| 2004/0168840 | A1 * | 9/2004 | Kuang et al. ............... 180/65.2 |
| 2005/0109549 | A1 | 5/2005 | Morrow |
| 2008/0039257 | A1 | 2/2008 | Holmes |
| 2008/0227576 | A1 | 9/2008 | Besnard et al. |

* cited by examiner

*Primary Examiner*—David D Le
*Assistant Examiner*—Erin D Bishop
(74) *Attorney, Agent, or Firm*—David B. Kelley; Brooks Kushman P.C.

(57) ABSTRACT

A hybrid electric vehicle and powertrain includes an engine and an electric machine connected to each other in a power-split arrangement. The electric machine is operable as a motor or a generator, and is offset from the engine, thereby reducing the overall length of the powertrain. A power transfer arrangement includes a planetary gear set in which the carrier is directly connected to an output shaft of the engine. The electric machine is connected to the planetary gear set through an intermediate gear, thereby facilitating the offset of the electric machine and the engine and facilitating an easy change of gear ratio for the motor/generator.

14 Claims, 1 Drawing Sheet

HYBRID ELECTRIC VEHICLE AND POWERTRAIN

CROSS-REFERENCE TO RELATED APPLICATIONS

This application is a division of U.S. application Ser. No. 11/464,589 filed 15 Aug. 2006, now U.S. Pat. No. 7,686,723, which is hereby incorporated herein by reference.

TECHNICAL FIELD

The present invention relates to a hybrid electric vehicle and a powertrain for such a vehicle.

BACKGROUND

With the ever increasing need to produce vehicles that are more fuel efficient, hybrid electric vehicles (HEV's) have provided an improvement in fuel economy over many conventional vehicles that utilize only an internal combustion engine to drive the vehicle. One of the primary advantages of an HEV is that it allows the vehicle to be powered by one or more electric motors under certain operating conditions. For example, if the speed of the vehicle is relatively moderate, and the battery or other electrical power source is sufficiently charged, the engine may be shut off, and the vehicle powered exclusively by the electric motors. As operating conditions change, the engine may be started to provide additional power, and if needed, operate a generator to charge the battery.

Various arrangements of internal combustion engines and electric machines—i.e., generators and motors—have been utilized in HEV's. For example, series arrangements, parallel arrangements, and power-split arrangements provide different ways for the engine and electric machines to interact to output torque to drive the vehicle. In one example of a power-split arrangement, an engine and an electric machine are both operatively connected to a planetary gear set, the output of which provides torque to vehicle drive wheels. One or more additional electric machines can be used to provide additional torque to the drive wheels, charge an energy storage device, such as a battery, provide electrical energy directly to another electric machine, or some combination thereof. In the power-split arrangement, power output from the engine flows through the planetary gear set, where a portion of the power is applied to the electric machine connected to the planetary gear set, and another portion of the engine power is transferred to the vehicle drive wheels.

In many examples of power-split arrangements, an engine output shaft is connected to one of the members of a planetary gear set, and an output shaft from an electric machine is connected to another of the members of the planetary gear set. These two torque-producing devices are often in-line with each other, such that their respective output shafts lie along the same axis. In some vehicle platforms, it may be desirable to reduce overall powertrain length by having torque-producing devices that are not in-line with each other.

In addition, it may be desirable to have a power-split configuration for an HEV powertrain that includes an electric machine having an output shaft that is not directly connected to a member of the planetary gear set. This would add flexibility to the configuration by providing a way to adjust gear ratios without changing the basic members of the transmission—e.g., the members of the planetary gear set.

SUMMARY

Accordingly, the present invention provides a hybrid electric vehicle and powertrain having a power-split configuration where the engine output shaft and the electric machine output shaft are offset from each other, thereby providing a shorter length to accommodate smaller packaging requirements.

The invention also provides a hybrid electric vehicle and powertrain that include one or more electric machines having outputs that are connected to intermediate and/or idler gears, such that the gear ratios for the electric machines can be changed without changing the primary members of the planetary gear set.

The invention also provides a hybrid electric vehicle having a plurality of wheels, and including an engine and a first electric machine, each of which is operable to output mechanical power. The first electric machine is also operable as a generator, and is configured to receive mechanical power from the engine and to output electrical power. The engine includes an output shaft defining a first axis, and the first electric machine includes an output shaft defining a second axis. The first and second axes are not coincident with each other, thereby providing an offset between the first electric machine and the engine. A power transfer arrangement cooperates with the engine and the first electric machine to provide power flow paths between the engine and at least one of the vehicle wheels, and between the first electric machine and the at least one vehicle wheel. The power transfer arrangement includes a planetary gear set having a plurality of members, including a sun gear, a plurality of planet gears, a carrier connecting the planet gears to each other, and a ring gear connected to the planet gears. One of the members of the planetary gear set provides an output member for the planetary gear set. The engine output shaft is directly connected to one of the members of the planetary gear set such that the mechanical power output from the engine is split between the first electric machine and the output member of the planetary gear set.

The invention further provides a hybrid electric vehicle as described above, and further includes a second electric machine defining a motor axis, and having an output connected to one of the members of the planetary gear set, such that the motor axis is coincident with the first axis. In such embodiments, the ring gear may provide the output member for the planetary gear set, and a planetary gear reduction arrangement can be connected to the output of the second electric machine and the ring gear. This increases the torque transferred from the second electric machine to the ring gear. In some embodiments, the planetary gear reduction arrangement includes a plurality of pinion gears that are connected to each other by a carrier. The carrier can be grounded to allow the pinions to rotate about their own axes without orbiting around the second electric machine.

The invention also provides a powertrain for a hybrid electric vehicle that includes an engine and a first electric machine, each of which is operable to output mechanical power to drive the vehicle. Embodiments of this powertrain can include a second electric machine that is also operable to provide torque to drive the vehicle. The first and second electric machines can each be connected to the powertrain through one or more intermediate or idler gears, and one or more intermediate or idler gears can be used on the output side of the powertrain such that the gear ratios of the electric machines can be changed without changing the members of the planetary gear set.

In one embodiment of the present invention, a hybrid electric vehicle powertrain includes an engine and two electric machines connected through a planetary gear set. Specifically, the engine is connected to the carrier of the planetary gear set, while the first electric machine is connected to the sun gear. An output shaft from the engine is directly connected to the carrier, while an output shaft of the first electric machine is connected to the sun gear through a first mounted gear attached to its output shaft, and a second gear mounted on a shaft directly connected to the sun gear. In this way, the engine and first electric machine are offset from each other, thereby reducing the overall length of the powertrain.

The ring gear provides the output for the planetary gear set, which provides power flow paths from the first electric machine and the engine to vehicle drive wheels. The vehicle drive wheels are connected to a differential, which itself is connected to the ring gear through a mounted gear on a differential shaft, and an idler gear intermeshing with the differential mounted gear and the ring gear of the planetary gear set. The second electric machine is also connected to the powertrain through a mounted gear on its output shaft, and an idler gear intermeshing with its mounted gear and the ring gear from the planetary gear set. The differential shaft and the shaft of the second electric machine are also offset from each other, thereby further helping to ensure a shorter powertrain.

In some embodiments, the second electric machine can be a relatively small unit, and in such a case can be connected to the planetary gear set such that it is in-line with the engine. This can be accomplished by connecting the first electric machine to the planetary gear set as described above, and providing a central opening through the second electric machine so that the sun gear shaft passes through it. The output from the second electric machine can be provided to a planetary gear reduction arrangement to increase the torque provided to the ring gear of the planetary gear set. This may be advantageous, since, as described above, the second electric machine may be a relatively small unit. As with other embodiments, the output from the planetary gear set can be through the ring gear, which is connected to an idler gear intermeshing with a mounted gear on the differential shaft. Thus, embodiments of the present invention provide a combination of flexibility with regard to changing gear ratios and compact size to accommodate the smaller packaging requirements of many HEV platforms.

DETAILED DESCRIPTION

Figure 1:
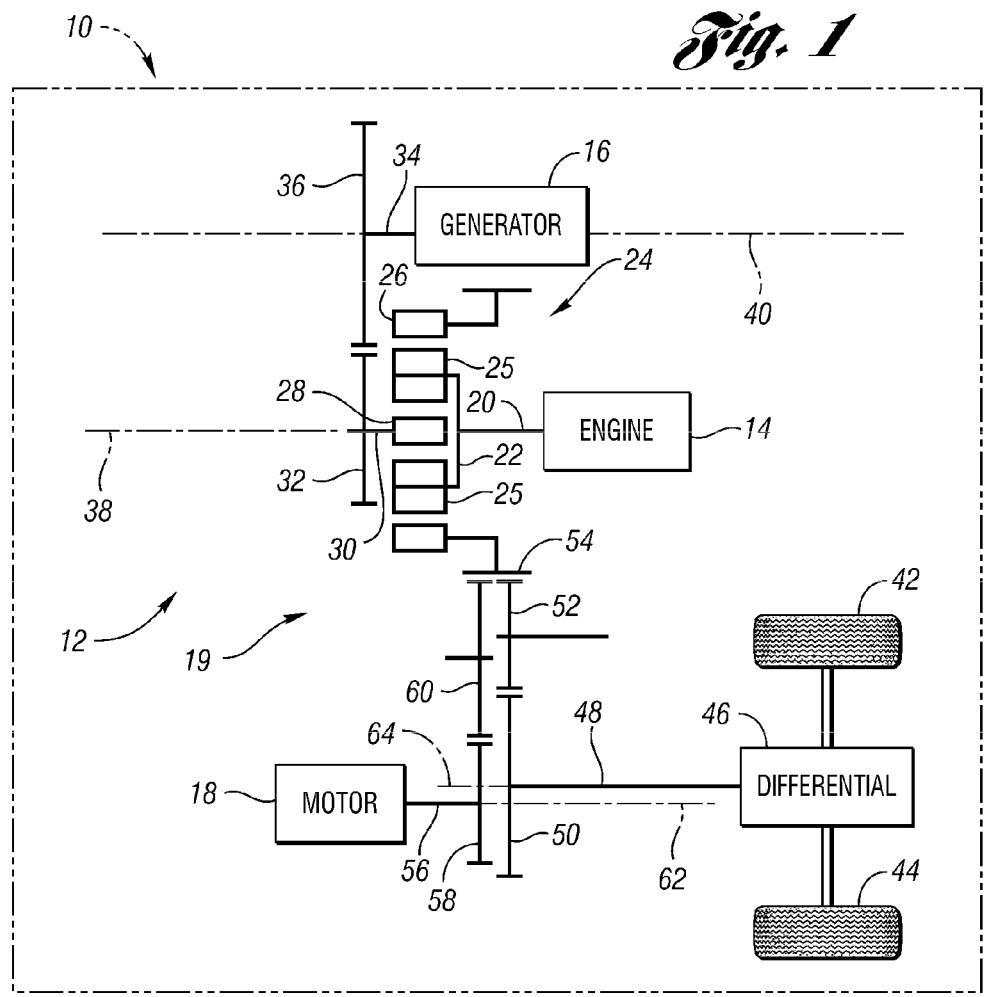
FIG. 1 shows a schematic representation of a vehicle and powertrain in accordance with one embodiment of the present invention.

FIG. 1 shows a vehicle 10 in accordance with one embodiment of the present invention. The vehicle 10 includes a powertrain 12 having three torque producing devices: an engine 14 and two electric machines 16, 18. In the embodiment shown in FIG. 1, the first electric machine 16 is labeled "Generator" and the second electric machine 18 is labeled "Motor"; however, it is understood that each of the electric machines 16, 18 can act as either a motor to produce mechanical power, or as a generator to produce electric power upon receiving a mechanical power input. The engine 14 and the electric machines 16,18 are each connected to a power transfer arrangement 19 that provides power flow paths from these torque-producing devices to an output of the powertrain 12 to drive the vehicle 10.

The engine 14 includes an output shaft 20 that is connected to a carrier 22 of a planetary gear set 24, which is part of the power transfer arrangement 19. The carrier 22 connects a plurality of planet gears 25 to each other. The planetary gear set 24 also includes a ring gear 26, and a sun gear 28. The sun gear 28 is connected to a first input shaft 30, which has a first intermediate gear 32 attached thereto. The generator 16 has an output shaft 34, which has attached to it a first mounted gear 36. The mounted gear 36 cooperates with the intermediate gear 32 to provide a power flow path between the generator 16 and the planetary gear set 24. As shown in FIG. 1, the output shaft 20 of the engine 14 defines a first axis 38, while the output shaft 34 of the generator 16 defines a second axis 40. The two axes 38, 40 are not coincident with each other, which can help to reduce the overall length of the powertrain 12.

As shown in FIG. 1, the vehicle 10 includes a pair of drive wheels 42, 44. The drive wheels 42, 44 receive power through a differential 46 in the powertrain 12. The differential 46 includes an input shaft 48 that is attached to a second mounted gear 50. The mounted gear 50 intermeshes with a first idler gear 52, which, in turn, intermeshes with a second intermediate gear 54 mounted to the ring gear 26. The ring gear 26 is the output member for the planetary gear set 24. Thus, the power transfer arrangement 19 provides power flow paths from each of the generator 16 and the engine 14 through the planetary gear set 24, through the idler gear 52 and the mounted gear 50, and through the differential 46 to the vehicle drive wheels 42, 44.

The power transfer arrangement 19 also provides a power flow path from the motor 18 to the vehicle drive wheels 42, 44 through the following elements. The motor 18 includes an output shaft 56 attached to a third mounted gear 58. The third mounted gear intermeshes with a second idler gear 60, which itself intermeshes with the gear 54 attached to the ring gear 26 of the planetary gear set 24.

The vehicle 10 and its powertrain 12 provide advantages over conventional power-split arrangements, in that the gear ratios for any of the torque-producing members can be modified by changing one or more of the mounted gears 36, 50, 58; one or more of the intermediate gears 30, 54; one or more of the idler gears 52, 60; or some combination of the above. None of these gear changes, however, requires a change of the primary elements of the planetary gear set 24. This provides a relatively easy and cost effective way to effect gear ratio changes, for example, when a power-split configuration is adapted to a new vehicle platform.

As discussed above, the engine axis 38 and the generator axis 40 are offset from each other to reduce the overall length of the powertrain 12. Similarly, the motor output shaft 56 defines a third axis 62, and the differential shaft 48 defines a fourth axis 64, which are also not coincident with each other. This allows the motor 18 and the differential 46 to be offset from each other, and again, may help to reduce the overall length of the powertrain 12.

Figure 2:
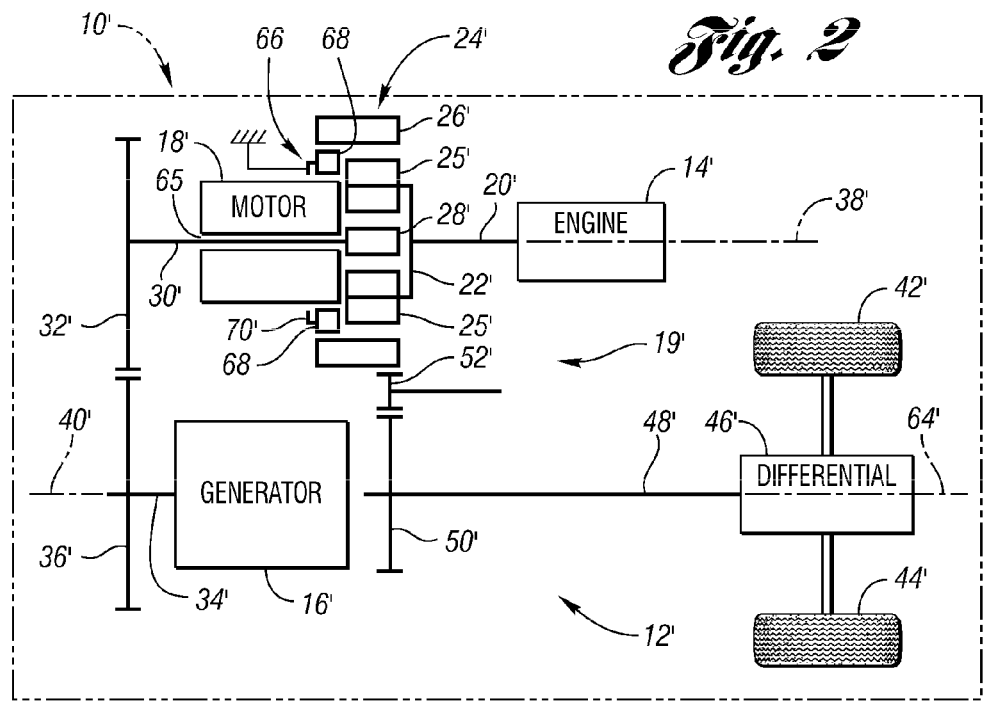
FIG. 2 shows a schematic representation of a vehicle and powertrain in accordance with another embodiment of the present invention.

FIG. 2 shows a vehicle 10' having a powertrain 12' in accordance with another embodiment of the present invention. Throughout the description of the vehicle 10', and the powertrain 12', elements having counterparts in the vehicle 10 shown in FIG. 1, are marked with the prime (') symbol. Similar to powertrain 12, the powertrain 12' includes an engine 14' having an output shaft 20' directly connected to a carrier 22' of a planetary gear set 24'. The generator 16' includes an output shaft 34' defining an axis 40'. The axis 40' is not coincident with axis 38' defined by the engine output shaft 20'. Thus, like the embodiment shown in FIG. 1, the vehicle 10' provides the advantage of a reduced overall length for the powertrain 12' by offsetting the generator 16' from the engine 14'. Unlike the powertrain 12 shown in FIG. 1, the powertrain 12' includes a second motor 18' that is directly in-line with the engine 14'. The vehicle 10' provides an example of using a small second motor 18' to reduce the size and weight of the vehicle 10'. Because the motor 18' is relatively small, it can be placed in-line with the engine 14' without undesirably increasing the length of the powertrain 12'.

As shown in FIG. 2, the shaft 30', which provides an input to the sun gear 28', traverses an opening 65 in the motor 18' to allow the generator 16' to be connected to the sun gear 28' with the motor 18' disposed therebetween. Because it is contemplated that the motor 18' will be a smaller electric machine, it may be desirable to increase the torque output from the motor 18' to the vehicle wheels 42', 44'. In the embodiment shown in FIG. 2, this is accomplished through the use of a planetary gear reductionarrangement 66 torque-transmittingly connected to the motor 18'.

The planetary gear reduction arrangement 66 includes a plurality of pinions 68 that are connected to each other by a carrier 70. The carrier 70 is grounded, which allows the pinions 68 to rotate about their own axes without orbiting around the motor 18'. This arrangement provides for an increase in torque from the motor 18' to the ring gear 26', and ultimately, to the vehicle drive wheels 42', 44'. Also shown in FIG. 2, the generator axis 40' and the differential axis 48' are coincident with each other, but can easily be made offset from each other to further help reduce the overall length of the powertrain 12'. Similar to the embodiment shown in FIG. 1, the gear ratios for the torque producing elements—i.e., the engine 14', the generator 16', and the motor 18'—can all be changed without changing the primary elements of the planetary gear set 24'.

While the best mode for carrying out the invention has been described in detail, those familiar with the art to which this invention relates will recognize various alternative designs and embodiments for practicing the invention as defined by the following claims.

What is claimed:

1. A hybrid electric vehicle having a plurality of wheels, the vehicle comprising:
    an engine operable to output mechanical power and including an engine output shaft defining a first axis;
    a first electric machine including an output shaft defining a second axis that is not coincident with the first axis, the first electric machine being operable as a motor to output mechanical power, and operable as a generator configured to receive mechanical power from the engine and to output electrical power;
    a power transfer arrangement cooperating with the engine and the first electric machine to provide power flow paths between the engine and at least one of the vehicle wheels, and between the engine and the first electric machine, the power transfer arrangement including a planetary gear set having a plurality of members, including a sun gear, a plurality of planet gears, a carrier connecting the planet gears to each other, and a ring gear, one of the members of the planetary gear set providing an output member for the planetary gear set, the engine output shaft being directly connected to one of the members of the planetary gear set such that the mechanical power output from the engine is split between the first electric machine and the output member of the planetary gear set;
    a second electric machine defining a motor axis and having an output connected to one of the members of the planetary gear set such that the motor axis is coincident with the first axis; and
    a planetary gear reduction arrangement torque-transmittingly connected to the output of the second electric machine and the output member for the planetary gear set, thereby increasing the torque transferred from the second electric machine to the output member for the planetary gear set, the planetary gear reduction arrangement including a plurality of pinion gears and a grounded carrier connecting the pinion gears to each other.

2. The vehicle of claim 1, further comprising:
    a first mounted gear attached to the output shaft of the first electric machine;
    a first input shaft connected to one of the members of the planetary gear set to provide an input member to the planetary gear set for the first electric machine; and
    a first intermediate gear attached to the first input shaft and intermeshing with the first mounted gear to provide a power flow path between the output shaft of the first electric machine and the input member of the planetary gear set.

3. The vehicle of claim 2, further comprising:
    a differential operatively connected to the at least one vehicle wheel and having an input shaft;
    a second mounted gear attached to the input shaft of the differential; and
    a first idler gear intermeshing with the second mounted gear and the output member of the planetary gear set to provide a power transfer path between the output member of the planetary gear set and the at least one vehicle wheel.

4. The vehicle of claim 3, wherein the input shaft of the differential defines an axis that is not coincident with the first axis.

5. A hybrid electric vehicle having a plurality of wheels, the vehicle comprising:
    an engine operable to output mechanical power and including an engine output shaft defining a first axis;
    a first electric machine including an output shaft defining a second axis that is not coincident with the first axis, the first electric machine being operable as a motor to output mechanical power, and operable as a generator configured to receive mechanical power from the engine and to output electrical power;
    a power transfer arrangement cooperating with the engine and the first electric machine to provide power flow paths between the engine and at least one of the vehicle wheels, and between the engine and the first electric machine, the power transfer arrangement including a planetary gear set having a plurality of members, including a sun gear, a plurality of planet gears, a carrier connecting the planet gears to each other, and a ring gear, one of the members of the planetary gear set providing an output member for the planetary gear set, the engine output shaft being directly connected to one of the members of the planetary gear set such that the mechanical power output from the engine is split between the first electric machine and the output member of the planetary gear set; and
    a second electric machine defining a motor axis and having an output torque-transmittingly connected to a planetary gear reduction arrangement, which is connected to the output of the planetary gear set without an intermediate connection to any other member of the planetary gear set, the planetary gear reduction arrangement including a plurality of pinion gears and a grounded carrier connecting the pinion gears to each other.

6. The vehicle of claim 5, wherein the second electric machine is disposed relative to the engine such that the motor axis is coincident with the first axis.

7. The vehicle of claim 5, further comprising:
a first mounted gear attached to the output shaft of the first electric machine;
a first input shaft connected to one of the members of the planetary gear set to provide an input member to the planetary gear set for the first electric machine; and
a first intermediate gear attached to the first input shaft and intermeshing with the first mounted gear to provide a power flow path between the output shaft of the first electric machine and the input member of the planetary gear set.

8. The vehicle of claim 7, further comprising:
a differential operatively connected to the at least one vehicle wheel and having an input shaft;
a second mounted gear attached to the input shaft of the differential; and
a first idler gear intermeshing with the second mounted gear and the output of the planetary gear set to provide a power transfer path between the output member of the planetary gear set and the at least one vehicle wheel.

9. The vehicle of claim 8, wherein the output shaft of the second electric machine defines a third axis, and the input shaft to the differential defines a fourth axis that is not coincident with the third axis.

10. A powertrain for a hybrid electric vehicle, comprising:
an engine operable to output mechanical power to drive the vehicle and including an engine output shaft defining a first axis;
a first electric machine operable as a motor to output mechanical power and including an output shaft defining a second axis that is not coincident with the first axis, the first electric machine being further operable as a generator configured to receive mechanical power from the engine and to output electrical power;
a power transfer arrangement cooperating with the engine and the first electric machine to provide at least one power flow path, including a power flow path between the engine and the first electric machine, the power transfer arrangement including a planetary gear set having a plurality of members, including a sun gear, a plurality of planet gears, a carrier connecting the planet gears to each other, and a ring gear, one of the members of the planetary gear set providing an output member for the planetary gear set, the first electric machine being connected to one of the sun gear or the ring gear, and the engine output shaft being directly connected to the carrier, thereby facilitating a transfer of at least a portion of the power output from the engine to the first electric machine;
a second electric machine defining a motor axis coincident with the first axis and having an output connected to the output of the planetary gear set without an intermediate connection to any other member of the planetary gear set; and
a planetary gear reduction arrangement torque-transmittingly connected to the output of the second electric machine and the output of the planetary gear set, thereby increasing the torque transferred from the second electric machine to the planetary gear set.

11. The powertrain of claim 10, wherein the planetary gear reduction arrangement includes a plurality of pinion gears and a grounded carrier connecting the pinion gears to each other.

12. The powertrain of claim 10, further comprising:
a first mounted gear attached to the output shaft of the first electric machine;
a first input shaft connected to one of the sun gear or ring gear to provide an input member to the planetary gear set for the first electric machine; and
a first intermediate gear attached to the first input shaft and intermeshing with the first mounted gear to provide a power flow path between the output shaft of the first electric machine and the input member of the planetary gear set.

13. The powertrain of claim 12, the vehicle including a plurality of wheels, the powertrain further comprising:
a differential having an output operatively connected to two of the vehicle wheels and having an input shaft;
a second mounted gear attached to the input shaft of the differential; and
a first idler gear intermeshing with the second mounted gear and the output of the planetary gear set to provide a power transfer path between the output member of the planetary gear set and the differential.

14. The powertrain of claim 13, wherein the output shaft of the second electric machine defines a third axis, and the input shaft to the differential defines a fourth axis that is not coincident with the third axis.

* * * * *